Sept. 20, 1960 R. C. BINNING ET AL 2,953,502
SEPARATION OF AZEOTROPIC MIXTURES
Filed May 24, 1955
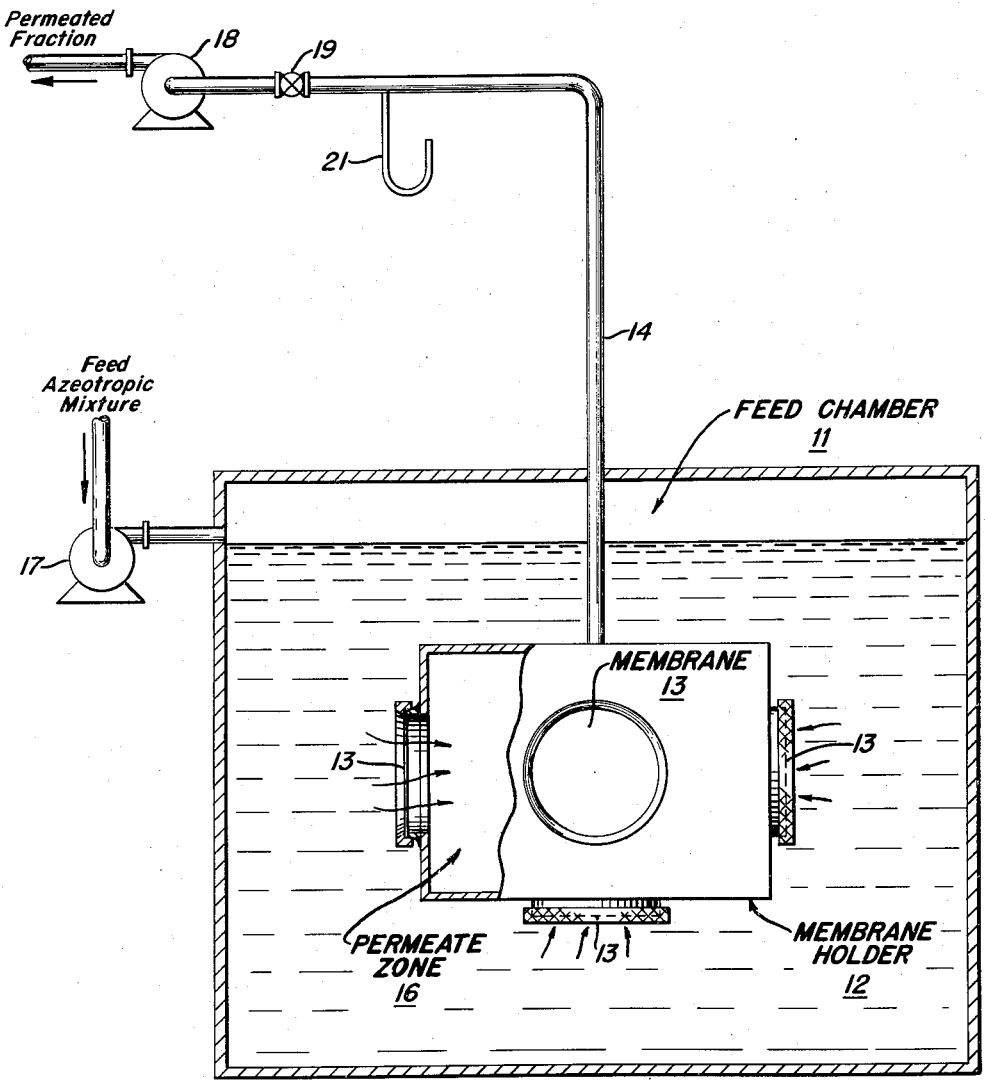
INVENTORS:
Robert C. Binning
Robert J. Lee
BY Joseph C. Kotarski
ATTORNEY

United States Patent Office 2,953,502
Patented Sept. 20, 1960

2,953,502

SEPARATION OF AZEOTROPIC MIXTURES

Robert C. Binning, Texas City, and Robert J. Lee, La Marque, Tex., assignors to The American Oil Company, Texas City, Tex., a corporation of Texas Filed May 24, 1955, Ser. No. 510,856

9 Claims. (Cl. 202—42)

This invention relates to the separation of azeotropic mixtures. In particular it concerns the separation of azeotropic mixtures by a combination process employing permeation through non-porous plastic membranes and distillation.

When mixtures of compounds are distilled which produce vapors having the same composition as the liquid, the particular mixture undergoing distillation is an azeotropic mixture. The boiling points of azeotropes are either lower or higher than the boiling points of the components. Because of the constant boiling point, the individual components of the mixture cannot be separated by ordinary distillation. Azeotropic distillation wherein a third component is added to produce other azeotropic mixtures which are separable has been employed. However, the third component must be carefully selected so that the new azeotropes formed can be resolved by stratification, solvent extraction followed by distillation or distillation usually under vacuum. Because of the disadvantages of existing methods for separating azeotropic mixtures and since some of them are not separable at all by presently known techniques, a simple inexpensive process adaptable for all types of azeotropic mixtures is highly desirable.

An object of this invention is to provide a method and means for separating azeotropic mixtures. Another object is to provide a process employing a combination of permeation and distillation steps for separating azeotropic mixtures. A further object of the invention is to provide a simple inexpensive method and means for resolving azeotropic mixtures and recovering their components in essentially pure form. Other objects and advantages will be apparent from the detailed description of the invention in conjunction with the accompanying drawing in which the sole figure is a diagrammatic showing the apparatus for performing the permeation and distillation of an azeotropic mixture according to this invention.

It has been discovered that azeotropic mixtures can be separated by a combination of steps which include permeation of a portion of the azeotropic mixture through a non-porous plastic membrane followed by distillation of at least a portion of the permeated and/or non-permeated fractions to separate therefrom an essentially pure component of the azeotropic mixture.

By my invention it is possible to separate a wide variety of azeotropic mixtures and recover the components of the mixtures in essentially pure form. The azeotropic mixtures may contain two, three, or more components. The azeotropic mixture may be a minimum boiling mixture or a maximum boiling mixture. Various binary azeotropic mixtures which consists of water plus some organic compound may be easily resolved by my invention into the separate components. Azeotropic mixtures of water with alcohols such as ethanol, allyl alcohol, isopropyl alcohol, n-propyl alcohol, the various butyl alcohols, furfuryl alcohol, cyclopentanol, or other alcohols can be separated. The azeotropic mixtures of water with other diverse organic compounds such as carbon disulfide, dichloromethane, formic acid, nitromethane, dichloroethylene, dichloroethane, bromoethane, iodoethane, ethyl nitrate, acrylonitrile, epichlorohydrin, methylchloro acetate, dioxane, methylal, isobutyric acid, methyl lactate, ethyl ether, pyridine, butyl acetate, anisole, phenyl propyl ether, may be separated by my invention to yield the pure components. Azeotropic mixtures which consist of two or more organic compounds may be separated e.g. the azeotropic mixture of acetone with carbon disulfide may be resolved. Those azeotropic mixtures which consist of hydrocarbon plus some organic compound such as a substituted hydrocarbon may be separated. For example, the pure components can be recovered from the azeotropic mixture of benzene with methanol. Other azeotropic mixtures of this type such as the following: xylene-acetic acid, ethyl benzene-2-chloroethanol, styrene-2-chloroethanol, benzene-cyclohexanol, benzene-2-butanone, cyclohexane-2-butanone, heptane-2-butanone, isoprene-ethyl alcohol, hexane-ethyl alcohol, and similar azeotropic mixtures may be separated and their pure components recovered. Azeotropic mixtures of hydrocarbons, e.g. benzene-2,4-dimethylpentane, benzene-methylcyclopentane, benzene-cyclohexane and others may be resolved to yield the pure component. Azeotropic mixtures such as water-pyridine-diisobutylene, water-isoamyl-alcohol-benzene, water-2-butanone-2-methylpentane, may be resolved to yield the essentially pure components. Other binary and ternary azeotropic mixtures which also may be separated are set forth "Azeotropic Data" by L. H. Horsley (1952). While certain of these known azeotropic mixtures are separable by existing techniques, others of the azeotropic mixtures are not presently separable. Since our invention is generally applicable to all azeotropic mixtures, it will now be possible to separate many azeotropic mixtures which heretofore have not been separable.

In the first step of our process a portion of the azeotropic mixture is permeated through a non-porous plastic membrane. This is done by contacting the feed azeotropic mixture with one side (feed side) of a thin (e.g. 0.01 to 10 mils) non-porous plastic membrane in which one of the components of the azeotropic mixture is preferentially soluble. A portion of the azeotropic mixture is permeated through the membrane. A permeated and a non-permeated fraction are then separately recovered. Their compositions differ from each other and from the azeotropic mixture employed as feed. The permeated fraction will be enriched in the component of the azeotropic mixture which is more soluble in the membrane. The non-permeated fraction will be depleted in this component and enriched in the component which is less soluble in the membrane. Thus the permeated fraction will have a higher concentration of the component more soluble in the membrane than the concentration of this component present in the feed or in the non-permeated fraction. The non-permeated fraction will have a lower concentration of the component more soluble in the membrane than the concentration of this same component in the permeate or in the feed.

In order for permeation to occur, there must be a concentration gradient between the two zones, the higher concentration being present in the feed zone and the lower concentration being present in the permeate zone. Under such conditions a portion of the feed azeotropic mixture will dissolve within the membrane and permeate therethrough.

The permeation step is conducted by contacting the feed azeotropic mixture in either the liquid or vapor state with the membrane and recovering the permeated fraction from the opposite side of the membrane in either the liquid or the vapor state. To facilitate rapid permeation the concentration of permeated components at the surface of the membrane on the permeate side should be kept low by rapid removal of the permeate fraction or dilution thereof with a diluent liquid or gas. If a diluent is employed, it should be separable from the permeate fraction by distillation or other means. Examples of suitable diluents are steam, air, butane, and the like. A preferred method of operating consists of contacting the feed while in the liquid phase with the membrane and removing the permeated components in the vapor phase from the opposite side of the membrane.

The feed azeotropic mixture may be continuously or intermittently introduced into the feed zone. The permeated fraction thereof is removed from the opposite side of the membrane and is rapidly removed from the permeation zone in a continuous manner. The non-permeated fraction may be continuously or intermittently removed. The rate of introduction of the feed and the removal of the non-permeated fraction may be adjusted to provide the desired proportions of permeated and non-permeated fractions. In order to obtain a partial resolution of the azeotropic mixture it is of course, essential that only a portion of the feed be permeated. From as little as 10% to as much as 90% of the feed may be permeated per permeation stage. Usually the permeation of about 50% of the feed per stage is satisfactory. A number of permeation stages may be employed. Permeated and non-permeated fractions may be recycled to the various stages when suitable. In each permeation zone the membrane may be used in the form of sheets, tubes, or other structure which preferentially provides a maximum amount of membrane surface while utilizing a minimum volume of space.

The absolute pressures in the feed and permeate zones may vary from sub-atmospheric to super-atmospheric. Pressure differentials of from 10 mm. Hg to as high as 500 or 1000 p.s.i.g. or higher may be used, depending upon the strength of the membrane, the supporting means therefor, etc. It is usually preferred to operate the permeate zone at sub-atmospheric pressures and the feed zone at atmospheric or super-atmospheric pressures up to about 100 p.s.i.g. or higher. By maintaining the pressure within the permeate zone at sub-atmospheric pressure, the permeated fraction is easily evaporated from the permeate side of the membrane and removed from the permeate zone in the vapor state. By maintaining the feed in the liquid phase in contact with the membrane, the concentration of the preferentially permeable component of the azeotrope is present in a high concentration at the membrane surface. This affords a high driving force, enabling high rates of permeation.

The permeation step is preferably operated at as high a temperature as is possible without causing the membrane to weaken to the point of rupture under the particular permeation conditions employed. The higher operating temperatures are desirable because increased rates of permeation are thereby obtained. A wide range of temperatures, e.g. from about 0° C. to 250° C. may be employed depending to some extent upon the particular membrane used, the composition of the feed, and the pressures in the feed and permeate zones.

The membrane which is employed is non-porous, i.e. it is free from holes, tears, etc., which destroy the continuity of the membrane surface. It must not contain pores because if the feed were to leak therethrough, the selectivity of the permeation step would be destroyed. The membrane which is employed is of a plastic type material. It is not composed of porous or sintered metal, ceramic materials, porous glass or the like. Materials of the latter type are used in mass diffusion for the separation of gases wherein advantage is taken of the phenomenon that different gases diffuse through a porous medium at rates which vary inversely with the square root of their density or molecular weight. The membrane should be as thin as possible and yet retain sufficient strength and stability to be useful in the permeation process. It may vary from 0.01 to 10 mils or somewhat more. Higher rates of permeation are obtained with the thinner membranes. Supports such as fine mesh wire screen, porous sintered metals, or ceramic materials may be used as backing or supporting means for the membrane to minimize the possibility of the membrane rupturing. Permeation through non-porous plastic membranes has been described in the prior art in U.S. 2,540,151 to S. W. Weller et al. and U.S. 2,159,434 to F. E. Frey.

The membrane employed in the permeation step is comprised of a material in which one of the components of the azeotropic mixture is more soluble than the other components. For purposes of illustration, the membranes may be classified into two general types: (1) hydrophilic membranes, viz. those membrane compositions in which water and hydrophilic compounds are preferentially soluble and (2) hydrophobic membranes, viz. those membrane compositions in which hydrophobic compounds such as benzene, heptane, other organic compounds, etc., are more soluble than the hydrophilic compounds. If all of the components of the azeotropic mixture are hydrophilic, then a hydrophilic membrane should be used; for if a hydrophobic membrane were employed, the permeation rate would be negligible. Likewise, if all of the components of the azeotropic mixture are hydrophobic, then a hydrophobic membrane should be employed. If the azeotropic mixture contains both hydrophilic and hydrophobic components, then either a hydrophilic or a hydrophobic membrane may be employed. The components of the azeotropic mixture which will be found in the permeate fraction in a higher concentration than the other components is that component which is more soluble in or more nearly like the membrane.

For example, if an azeotropic mixture of water with some other hydrophilic compound is employed as feed, then a hydrophilic membrane is preferably employed. Suitable membranes which are useful in separating all azeotropic mixtures of water with organic compounds such as ethyl alcohol, butyl alcohols, carbon disulfide, pyridine, methyl ethyl ketone, formic acid, and others which have been listed previously, are composed of cellulosic materials such as cellulose acetate (partially or completely esterified, e.g., having an acetyl content of 35 to 44.8%) and regenerated cellulose, polymers of vinyl alcohol, polyacrylonitrile, nylon, and other materials of similar hydrophilicity. The permeated fraction will be enriched in water. This type of membrane is also useful in separating a more strongly hydrophilic organic compound from a less hydrophilic organic compound. For example such membranes are useful in permeating acetone selectively from an azeotropic mixture thereof with carbon disulfide. Similarly, methanol is selectively permeated from the azeotropic mixture thereof with benzene. Many other azeotropic mixtures of hydrocarbons with organic compounds such as have been previously discussed may similarly be separated.

If the azeotropic mixture consists only of more hydrophobic components, then a more hydrophobic such as is composed of the higher molecular weight esters and ethers of cellulose should be used. Such membranes are useful in separating azeotropic mixtures of hydrocarbons, e.g., benzene-2,4-dimethylpentane, benzene-methylcyclopentane. They are also useful in separating azeotropic mixtures of other organic compounds such as azeotropic mixtures composed of a hydrocarbon and a substituted hydrocarbon. Membranes comprised of cellulose propionate, cellulose butyrate, cellulose acetate-butyrate, for example cellulose acetate-butyrate having an acetyl content of 5 to 15% and a butyryl content of 35 to 50% are highly effective. Cellulose ether membranes comprised of ethyl cellulose, propyl cellulose, butyl cellulose, methylamyl cellulose, for example, ethyl cellulose having an ethoxyl content of about 40 to 50% by weight is also highly useful. Membranes comprised of mixtures of cellulose esters and ethers also may be used.

Polyethylene, polystyrene, neoprene, and similar extremely hydrophobic membranes may be used when it is desired to permeate selectively the hydrophobic component of a hydrophobic-hydrophilic azeotropic mixture such as the azeotropic mixture of benzene with methanol or carbon disulfide with acetone. The benzene and the carbon disulfide permeate preferentially to the other components. It must, of course, be remembered that permeation may occur at widely different rates when using membranes of different composition. Also if different azeotropic mixtures are employed as feed to the permeation step using the same membrane, then the permeation rates may also vary greatly.

The permeated fraction and the non-permeated fraction are separately withdrawn from the permeation process. At least one, and often both of these fractions are then distilled. It may not be necessary to distill both fractions in order to recover both components of the azeotropic mixture in high purity since the azeotropic mixture and the operation of the permeation step may be such as to produce either a permeated or a non-permeated fraction which consists of one of these components in essentially pure form. For example, if about 30% of the azeotropic mixture of ethyl alcohol with water (96.4 volume percent ethyl alcohol—3.6 volume percent water) is permeated through a cellulose acetate membrane then a non-permeated fraction consisting of 99.3 volume percent ethyl alcohol is produced. The permeate fraction contains 11.5 volume percent water and 88.5 volume percent ethyl alcohol. It is fractionated to produce a bottoms fraction of water which is discarded from the system and an overhead fraction of an azeotropic mixture which is recycled to the permeation step.

If a binary azeotropic mixture is employed as feed to my process then the distillation of either the permeated fraction or the non-permeated will produce two streams. One stream which will be produced by the distillation of either the permeated or non-permeated fraction will be a mixture having approximately the composition of the azeotropic mixture (how close the composition of this stream corresponds with the recognized azeotropic mixture depends upon the efficiency of the fractionating column used). This stream is recycled as feed to the permeation step when complete resolution to the pure components is desired. If the permeated fraction is being distilled, then the second stream produced by distillation will consist of the component of the azeotropic mixture which was more soluble in the membrane. This second stream will contain this component in essentially pure form, i.e. 99% purity if efficient fractionating means are employed. When the non-permeated fraction is being subjected to distillation then the second stream produced will contain the component of the azeotropic mixture which was less soluble in the membrane. This component will be present in this second stream in essentially pure form. The distillation step can be operated to produce only overhead vapors and a liquid bottoms stream. If the azeotropic mixture has a minimum boiling point, then it will, of course, be present in the overhead stream and the pure component will be present in the bottoms stream. Conversely, if the azeotropic mixture has a maximum boiling point, then it will be present in the liquid bottoms stream and the essentially pure component will be taken overhead. When the azeotropic mixture employed as feed to our invention is a ternary azeotropic mixture, then three streams will usually be produced by the fractionation of either the permeated or non-permeated fractions i.e. a stream consisting of approximately the azeotropic mixture and streams consisting of the essentially pure components of the azeotropic mixture.

In a preferred embodiment of our invention an azeotropic mixture of methanol with benzene is resolved to produce the individual components in essentially pure form. The azeotropic mixture (39.1 wt. percent methanol—60.9 wt. percent benzene) is contacted at atmospheric pressure and in the liquid phase at reflux temperatures (58°–60° C.) with the feed side of a polyethylene membrane of about two mils in thickness. The absolute pressure in the permeate zone is about 100 mm. Hg, the permeate being withdrawn as a vapor. This provides a pressure differential of 660 mm. Hg across the membrane. The feed is introduced and non-permeated components removed from the feed zone at rates such that about one-half of the feed permeates the membrane. The rate of permeation is about 52 gals./hr./1000 sq. ft. of membrane surface. The composition of the permeate is about 17.5 wt. percent methanol—82.5 wt. percent benzene. The composition of the non-permeated fraction is about 60.5 wt. percent methanol—39.5 wt. percent benzene. The permeated fraction is condensed and is then fractionated in a column providing about 30 distillation stages to produce an overhead vapor stream having approximately the composition of the azeotropic mixture. This stream is condensed and recycled as feed to the permeation step. A liquid bottoms stream consisting of 99% purity benzene is withdrawn from the fractionator. The non-permeated fraction is similarly distilled to produce an overhead vapor stream having approximately the composition of the azeotropic mixture and a liquid bottoms stream which is 99% purity methanol. The combination process yields pure products in amounts equal to the amount of material which permeates the membrane in the one permeation stage. The other half of the product from distillation consists of the azeotropic mixture which is recycled to the process and ultimately recovered as pure components.

A number of experiments were performed which demonstrate the process of our invention. The apparatus used in the permeation step is of the type described in detail in copending S.N. 443,893. In brief it consists of a feed chamber 11 for the feed azeotropic mixture; a membrane holder 12 of box-like shape having five open faces across which the membrane 13 is sealed, the sixth face having sealed thereto a line 14 for removing the permeated fraction from the interior (permeate zone 16) of the membrane holder; and associated pumps 17, 18, pressure regulating 19 and measuring devices 21, and temperature controllers for controlling the temperature and pressure in the feed and permeate zones at those conditions desired. The apparatus provided a total membrane surface of 22 square inches.

*Example I*

In this example an azeotropic mixture of benzene with methanol was resolved to produce its pure components in accordance with our invention. About 1250 ml. of the azeotropic mixture of 60.9 wt. percent benzene—39.1 wt. percent methanol (corresponding to 58.4 vol. percent benzene—41.6 vol. percent methanol) were charged to the feed chamber of the permeation apparatus. Polyethylene membranes 2.0 mils in thickness were mounted on the membrane holder. The temperature in the permeation apparatus was about 60° C. the reflux temperature of the feed). The feed zone was maintained at atmospheric pressure and an absolute pressure of 30 mm. Hg was maintained in the permeate zone. Over a period of 21 hours about 632 ml. of permeate vapors were continuously withdrawn and condensed. This corresponds to an average permeation rate of 52 gals./hr./1000 sq. ft. of membrane surface. The remaining non-permeated fraction (which was in the liquid state while in contact with the feed side of the membrane) was then removed.

Analyses of the fraction first permeated revealed that it consisted of 91 wt. percent benzene and 9 wt. percent methanol. The selectivity factor for benzene is thus about 7.2. Because benzene permeates preferentially, the concentration of the benzene in the feed chamber decreases. As the concentration in the feed chamber decreases, successive portions of the permeate have a decreased concentration of benzene. The selectivity factor is essentially constant. Thus after about one-half of the charge has permeated, the composition of the total permeate is 82.5 wt. percent benzene and 17.5 wt. percent methanol, while the non-permeated fraction is composed of 39.5 wt. percent benzene and 60.5 wt. percent methanol. Portions of the permeated and non-permeated fractions were separately fractionated in a Hypercal column under conditions providing about 30 distillation stages. From a portion of the permeate 211 grams of 69 wt. percent benzene (approximately the composition of the azeotropic mixture) were taken overhead, and a bottoms fraction of 176 grams of 99 wt. percent purity benzene were recovered. A portion of the non-permeated material was fractionated and 131 grams of 54 wt. percent benzene were taken overhead, leaving 155 grams of 99+ wt. percent methanol as a bottoms fraction. Thus of the 673 grams fractionated, 331 grams of pure materials (benzene and methanol) were recovered. If a more efficient fractionation were employed the yield of recycle azeotrope would be somewhat less, about 10% and the yield of pure products would be about 10% greater. For every gallon of permeate recovered from the system, about one gallon of pure components are recovered from the fractionation steps.

*Example II*

To demonstrate the effect which the composition of the membrane has upon the composition of the permeated and non-permeated fractions, two experiments were performed under the same conditions except that a polyethylene membrane was employed in one experiment whereas a cellulose acetate membrane was employed in the other experiment. The conditions used were the same as those employed in Example I except for the composition of the particular mixture of benzene-methanol and the composition of the membranes. The feed employed consisted of 68 vol. percent benzene—32 vol. percent methanol. In the experiment wherein a polyethylene film of 2.0 mils thickness was used, the initial permeate had a composition consisting of 90.4 vol. percent benzene and 9.6 vol. percent methanol. The overall rate of permeation was 52 gallons of permeate/hr./1000 sq. ft. of membrane surface. When using the cellulose triacetate membrane (having an acetyl content of 43.5% and a two second average viscosity by the ASTM ball-drop method), the composition of the initial permeate was 30.5 vol. percent benzene and 69.5 vol. percent methanol. The overall rate of permeation was 75 gallons of permeate/hr./1000 sq. ft. of membrane surface. It is apparent that the polyethylene membrane is exceedingly hydrophobic because the benzene permeates preferentially therethrough. Conversely the cellulose triacetate is very hydrophilic because the methanol permeates therethrough preferentially.

*Example III*

In this example an azeotropic mixture of ethanol with water was separated to produce the pure components. The example is typical of an operation wherein an azeotropic mixture containing water and an organic compound is the charge stock. About 1240 ml. of 95.5 wt. percent ethanol—4.5 wt. percent water were charged as feed to the permeation apparatus. The membrane used was composed of cellulose acetate having an acetyl content of 39.5% and a three second viscosity by the ASTM ball-drop method. The temperature in the permeation apparatus was about 80° C. The feed was maintained in the liquid phase and the permeate in the vapor phase, the pressure in the feed zone being atmospheric and the absolute pressure in the permeate zone being 30 mm. Hg. Over a period of about 11 hours approximately 305 ml. of permeate vapors were continuously withdrawn and condensed. This corresponds to permeating approximately 29% of the charge at a permeation rate of 48 gallons of permeate/hr./1000 sq. ft. of membrane surface.

Analyses of the fraction first permeated revealed it consists of 71 wt. percent ethanol—29 wt. percent water. Theis corresponds to a selectivity factor for water of 8.5. The composition of the overall permeated fraction was 88.5 vol. percent ethanol—11.5 vol. percent water. This fraction is distillable in a fractionating column having 5 to 10 stages to produce about 24 ml. of water which is rejected from the process and 268 ml. of azeotropic mixture which is recycled as feed. The non-permeated fraction consists of 99.3 vol. percent ethanol and needs no further purification. Water-tert. butyl alcohol and water-primary n-amyl alcohol azeotropes have also been so separated.

*Example IV*

This example illustrates the manner in which an azeotropic mixture of carbon disulfide and acetone is separated to yield the pure components. It is illustrative of the way in which other azeotropic mixtures of organic compounds having varying degrees of hydrophilicity can be separated. About 1400 ml. of the azeotropic mixture containing 55.7 vol. percent carbon disulfide and 44.3 vol. percent acetone (which corresponds to 66.7 wt. percent carbon disulfide—33.3 wt. percent acetone) were charged to the feed chamber of the permeation apparatus. A cellulose triacetate membrane of 1.2 mils thickness and having the composition specified in Example II was mounted on the membrane holder. The temperature in the permeation apparatus was about 40° C. The mixture in the feed zone was maintained in the liquid phase and at atmospheric pressure while the permeate was removed in the vapor state from the opposite side of the membrane. A pressure of 30 mm. Hg absolute was maintained in the permeate zone. Over a period of three hours about 150 ml. of permeate vapors were continuously withdrawn and condensed. This corresponds to an average permeation rate of about 88 gallons of permeate/hr./1000 sq. ft. of membrane surface. Analyses showed that the permeated fraction contained 38 vol. percent carbon disulfide and 62 vol. percent acetone. The separation factor, alpha ($\alpha$) for carbon disulfide is 2.1. Fractionation of the permeated and non-permeated fractions will produce overhead streams of approximately the azeotropic composition which may be recycled to the permeation step and bottoms streams consisting of essentially pure acetone and carbon disulfide respectively. Azeotropic mixtures of hydrocarbons, e.g. benzene - 2,4 - dimethylpentane have been separated by permeation through a cellulose-acetate-butyrate membrane having an acetyl content of 5.9%, a butyryl content of 44.0% and an ASTM viscosity of 8.9 seconds.

The preceding examples are illustrative of the results which the process of our invention is capable of producing. Our invention provides a new method for separating azeotropic mixtures which is simple, inexpensive, and useful on all types of azeotropic mixtures. The azeotropic mixtures produced in industry today can be easily separated. Thus the complex azeotropes formed during the reaction of hydrogen and carbon monoxide in the Synthol Process, the azeotropic mixture of formic acid and water produced during the manufacture of polyvinyl-formate, and other important azeotropic compositions may be resolved into the pure components.

Thus having described our invention what we claim is:
1. The process of separating an azeotropic mixture which comprises introducing said azeotropic mixture into the feed chamber of a permeation apparatus comprised of a feed chamber sealed from a permeate zone by a thin plastic membrane in which one of the components of said azeotropic mixture is preferentially soluble, maintaining the mixture in the feed chamber in the liquid phase, contacting the liquid phase mixture in the feed chamber with the plastic membrane, permeating a portion of the liquid mixture into and through said membrane and vaporizing the permeated portion from the opposite surface of the membrane into the permeate zone, withdrawing the permeated portion from the permeate zone, withdrawing a non-permeated portion from the feed chamber, and distilling at least one of said portions to separate therefrom an essentially pure component of said azeotropic mixture.

2. The process of claim 1 wherein the permeate zone is maintained at a lower absolute pressure than the absolute pressure existing in the feed chamber.

3. The process of claim 1 wherein at least one of said permeated and non-permeated portions is distilled to separate therefrom a stream consisting essentially of a pure component of said azeotropic mixture and another stream approximating the azeotropic mixture in composition, and recycling the latter stream to the feed chamber of the permeation apparatus.

4. The process of claim 1 wherein an azeotropic mixture of water and an organic compound is separated.

5. The process of claim 1 wherein an azeotropic mixture of organic compounds is separated.

6. The process of separating an azeotropic mixture which comprises continuously introducing said azeotropic mixture into the feed chamber of a permeation apparatus comprised of a feed chamber sealed from a permeate zone by a thin plastic membrane in which one of the components of said azeotropic mixture is preferentially soluble, maintaining the mixture in the feed chamber in the liquid phase, contacting the liquid phase mixture in the feed chamber with the plastic membrane, permeating between about 10 and 90 percent of said liquid mixture into and through said membrane and vaporizing the permeated portion from the opposite surface of the membrane into the permeate zone, said permeate zone being maintained at an absolute pressure lower than the absolute pressure existing in the feed chamber, continuously withdrawing vapors of the permeated portion from the permeate zone, continuously withdrawing a non-permeated portion from the feed chamber, distilling at least one of said portions to separate therefrom a stream consisting essentially of a pure component of said azeotropic mixture and another stream approximating the azeotropic mixture in composition, recycling the latter stream to the feed chamber of the permeation apparatus together with added amounts of fresh azeotropic mixture so that the combined amounts are introduced into the feed chamber at approximately the same rate as the combined rates at which the permeated and non-permeated portions are being withdrawn.

7. The process of separating an azeotropic mixture selected from the group consisting of azeotropic mixtures of benzene with methyl alcohol, ethyl alcohol with water, tertiary butyl alcohol with water, primary-n-amyl alcohol with water, formic acid with water, methyl ethyl ketone with water, and carbon disulfide with acetone, which process comprises introducing said azeotropic mixture into the feed chamber of a permeation apparatus comprised of a feed chamber sealed from a permeate zone by a thin plastic membrane in which one of the components of said azeotropic mixture is preferentially soluble, maintaining the mixture in the feed chamber in the liquid phase, contacting the liquid phase mixture in the feed chamber with the plastic membrane, permeating a portion of the liquid mixture into and through said membrane and vaporizing the permeated portion from the opposite surface of the membrane into the permeate zone, withdrawing the permeated portion from the permeate zone, withdrawing a non-permeated portion from the feed chamber, and distilling at least one of said portions to separate therefrom an essentially pure component of said azeotropic mixture.

8. The process of claim 7 wherein the plastic membrane is a cellulosic membrane selected from the group consisting of cellulose acetate and regenerated cellulose.

9. The method of separating an azeotropic mixture which method comprises introducing said azeotropic mixture in a liquid phase into the feed chamber of a permeation apparatus having a plastic membrane therein which is .01 to 10 mils thick and wherein said azeotropic mixture contacts one side of said plastic membrane, in which one component of the mixture is preferentially soluble and which is free from holes, whereby the preferentially soluble component wets the membrane, maintaining the atmosphere on the other side of the membrane at a lower pressure than that imposed by said liquid phase and removing from said other side of the membrane vapors of the liquid with which it is wet whereby an intermediate product is obtained which is different from said azeotropic mixture in composition, and distilling said intermediate product to separate a substantially pure component from a second azeotropic mixture.

References Cited in the file of this patent

UNITED STATES PATENTS

| | | |
|---|---|---|
| 2,159,434 | Frey | May 23, 1939 |
| 2,386,826 | Wallach et al. | Oct. 16, 1945 |
| 2,475,990 | Robertson | July 12, 1949 |
| 2,540,152 | Weller | Feb. 6, 1951 |
| 2,583,601 | Schwertz | Jan. 29, 1952 |
| 2,593,540 | Cornwell et al. | Apr. 22, 1952 |
| 2,712,386 | Jones et al. | July 5, 1955 |

FOREIGN PATENTS

| | | |
|---|---|---|
| 663,720 | Great Britain | Dec. 27, 1951 |

OTHER REFERENCES

"Modern Plastics," June 1950 article by Simril and Hershberger, pages 97, 98, 100, 102, 150 to 152, 154 and 158.

Horsley: "Azeotropic Data," 1952, page 63.

"Technique of Organic Chemistry," vol. III, pt. I, "Separation and Purification" by Weissberger, pages 41 to 47, 1956.